US012140044B2

(12) United States Patent
Lee

(10) Patent No.: US 12,140,044 B2
(45) Date of Patent: Nov. 12, 2024

(54) BLADE WITH IMPROVED COOLING PERFORMANCE AND GAS TURBINE HAVING THE SAME

(71) Applicant: DOOSAN ENERBILITY CO., LTD., Changwon (KR)

(72) Inventor: Ki Don Lee, Changwon (KR)

(73) Assignee: HL MANDO CORPORATION, Changwon (KR)

( * ) Notice: Subject to any disclaimer, the term of this patent is extended or adjusted under 35 U.S.C. 154(b) by 0 days.

(21) Appl. No.: 18/397,071

(22) Filed: Dec. 27, 2023

(65) Prior Publication Data

US 2024/0318561 A1 Sep. 26, 2024

(30) Foreign Application Priority Data

Mar. 23, 2023 (KR) ........................ 10-2023-0038157

(51) Int. Cl.
*F01D 5/18* (2006.01)

(52) U.S. Cl.
CPC ............ *F01D 5/186* (2013.01); *F01D 5/181* (2013.01); *F05D 2260/202* (2013.01)

(58) Field of Classification Search
CPC ..... F01D 5/186; F01D 5/187; F05D 2260/202
See application file for complete search history.

(56) References Cited

U.S. PATENT DOCUMENTS 7,997,868 B1 8/2011 Liang
8,092,177 B2 * 1/2012 Liang ...................... F01D 5/186 416/97 R
10,443,396 B2 * 10/2019 Dyson ..................... F01D 5/186
2010/0068068 A1 * 3/2010 Liang ...................... F01D 5/186 416/97 R
2017/0356295 A1 * 12/2017 Dyson ..................... F01D 5/186

FOREIGN PATENT DOCUMENTS

CN 111201370 A * 5/2020 ............ F01D 25/12
KR 20180021553 A 3/2018
KR 20190036208 A 4/2019

* cited by examiner

*Primary Examiner* — Eldon T Brockman
(74) *Attorney, Agent, or Firm* — Harvest IP Law, LLP

(57) ABSTRACT

The present disclosure relates to a blade and a gas turbine, and a blade may include: a body part; an injection hole comprising a communication part connected to an internal flow passage formed inside the body part; and an extension connecting the communication part and a surface of the blade to each other and having a width gradually increasing from the communication part the surface of the blade and configured to inject a cooling fluid to the surface of the blade; and an injection guide means disposed in the extension and configured to uniformly inject the cooling fluid in an expanding manner so as to form a cooling film on the surface of the blade. According to the present disclosure, it is possible to form the cooling film wider on the surface of the blade, by preventing a problem of a separation that occurs during when the cooling fluid flows through materialization of the uniform injection of the cooling fluid to the surface of the blade.

11 Claims, 11 Drawing Sheets

【FIG 1】
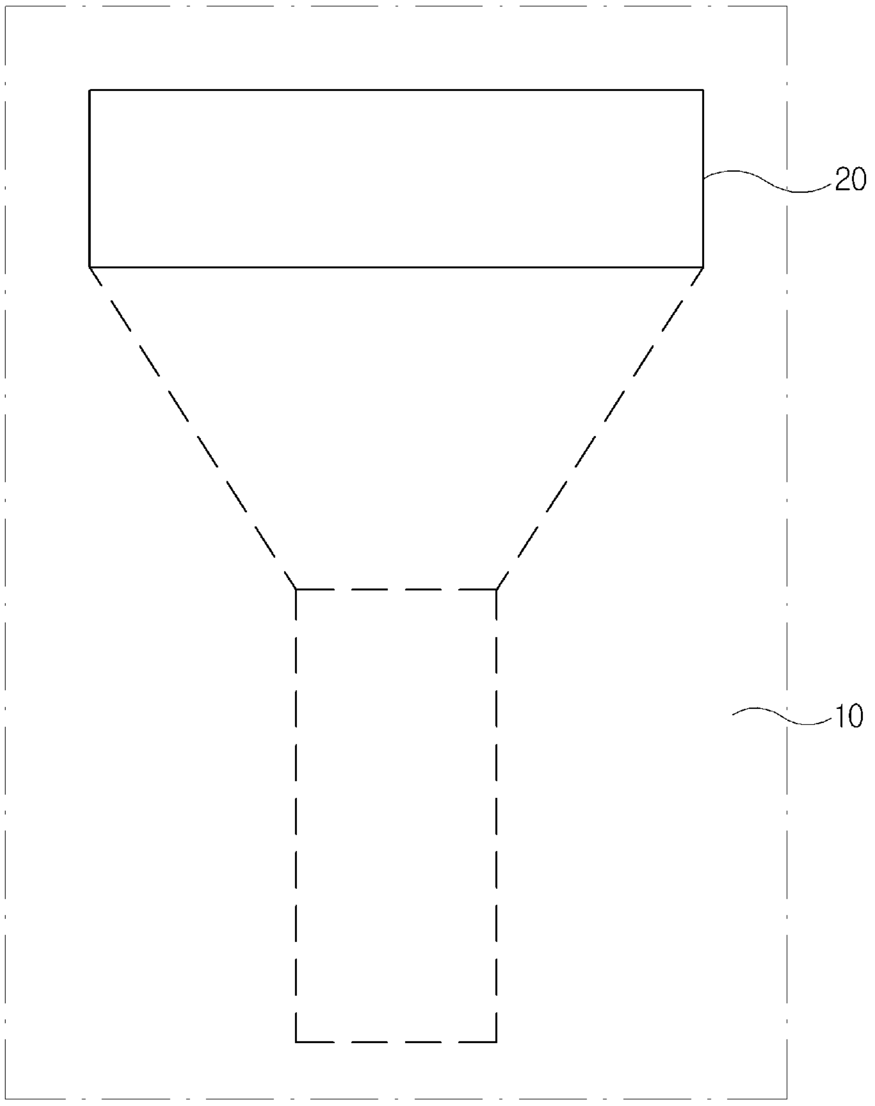
PRIOR ART

【FIG 2】
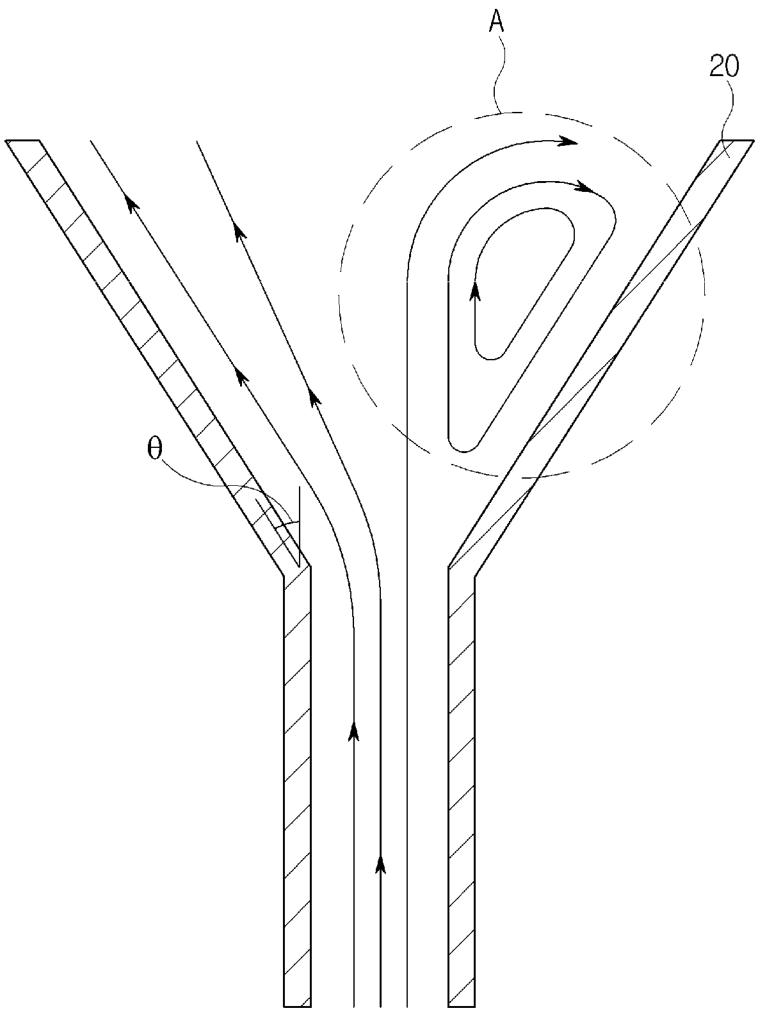
PRIOR ART

【 FIG 3】
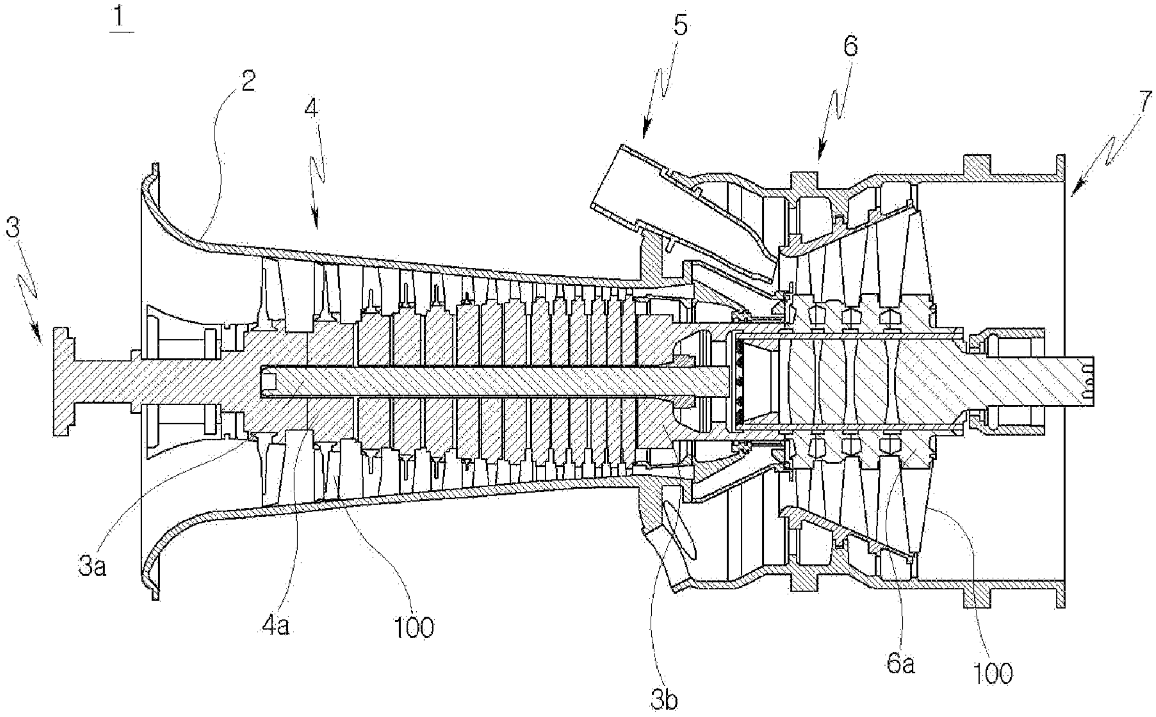

【 FIG 4】
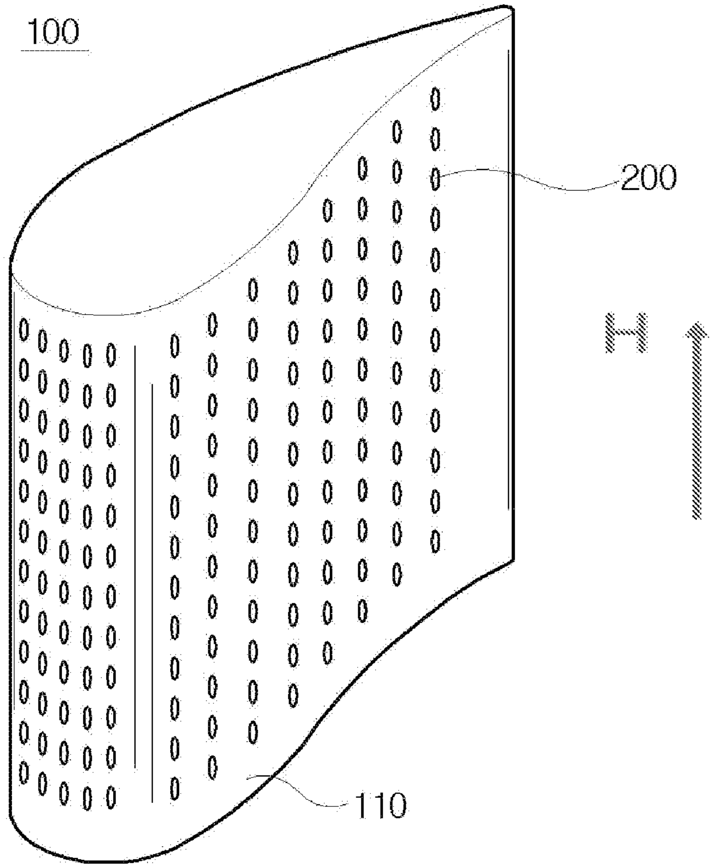

【FIG 5】
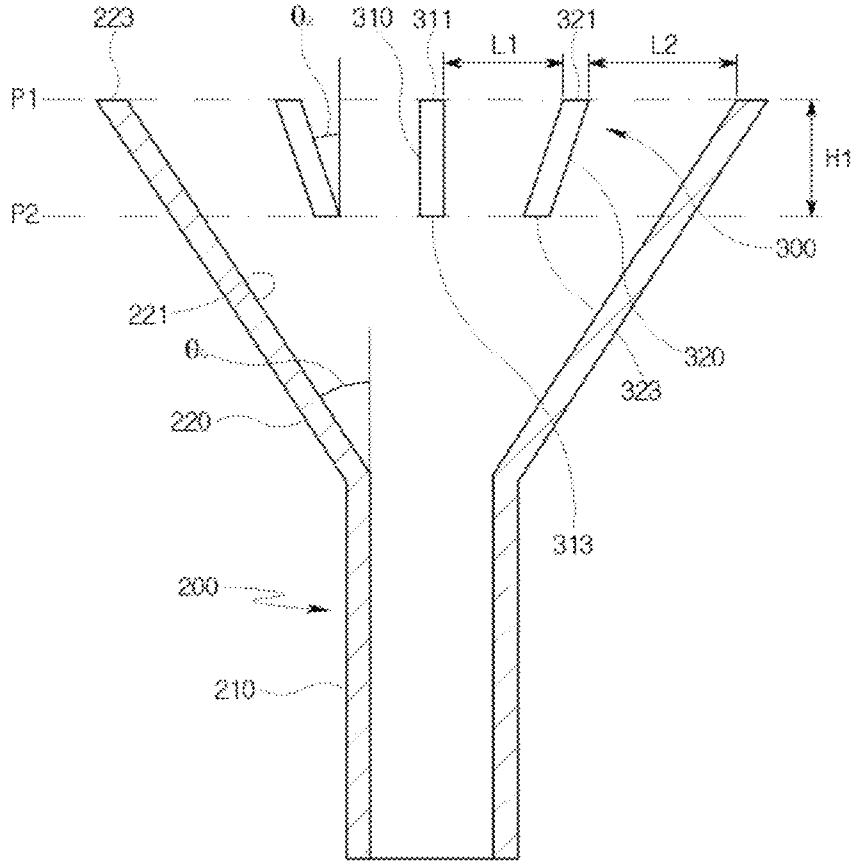

【FIG 6】
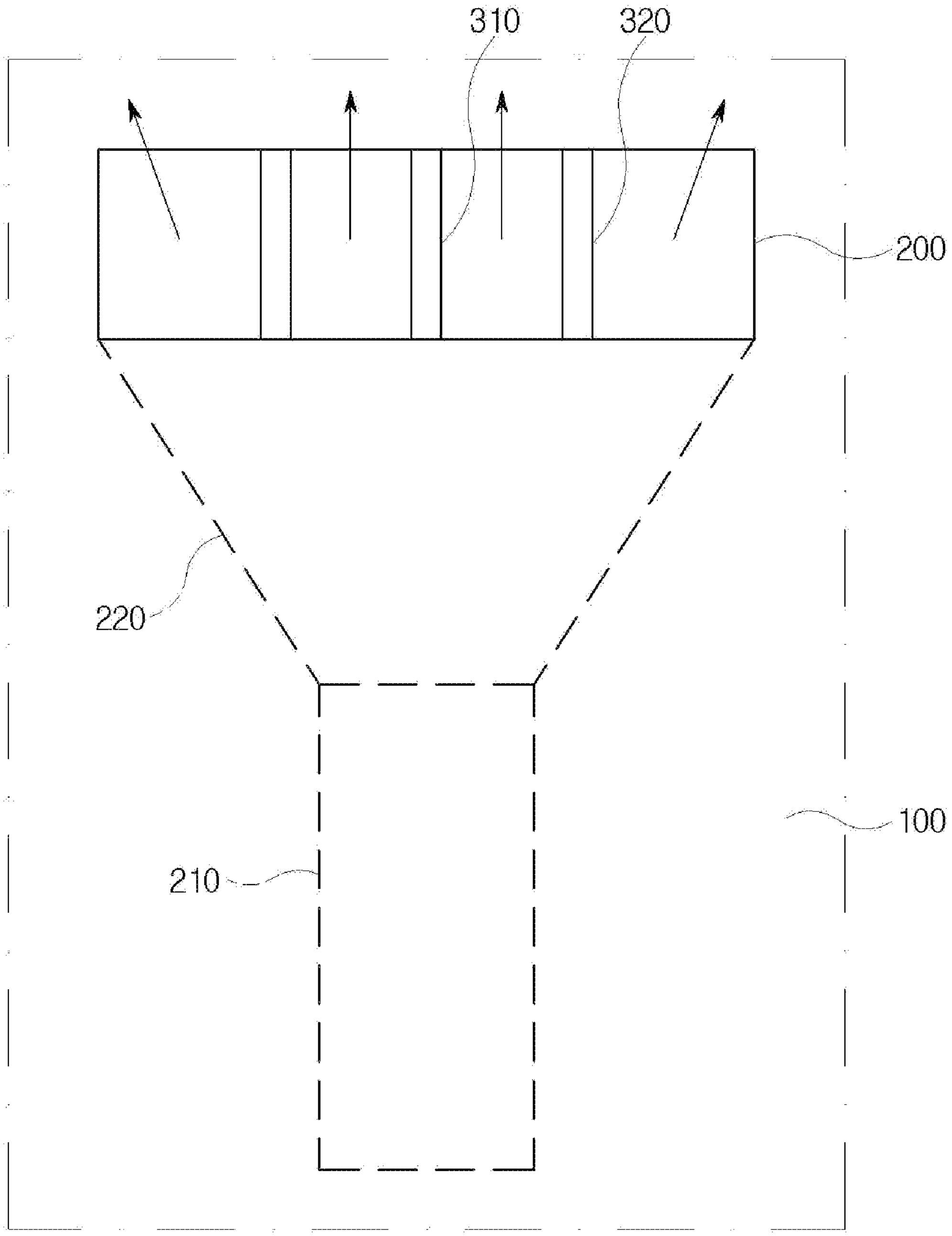

【FIG 7】
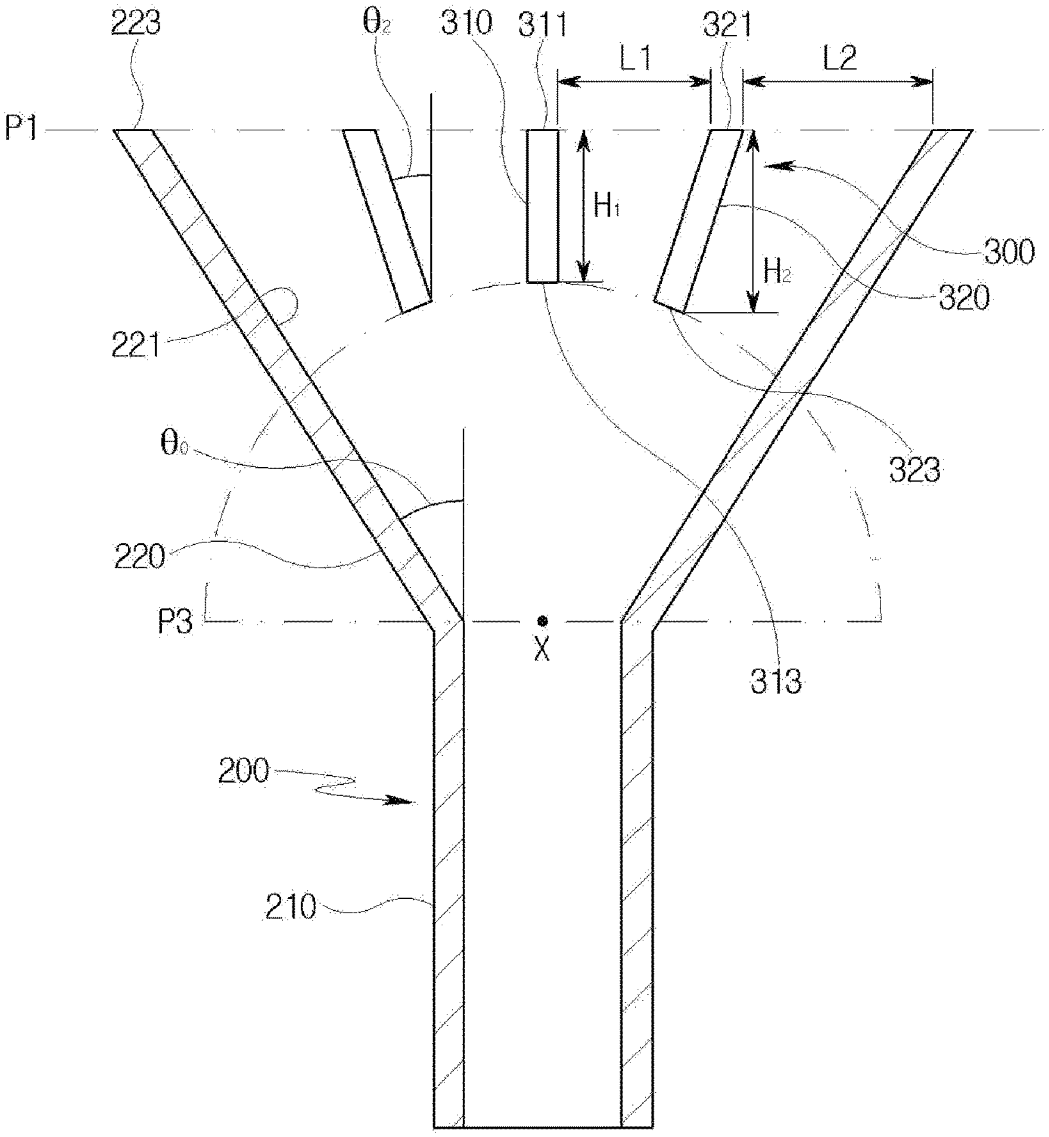

【FIG. 8】
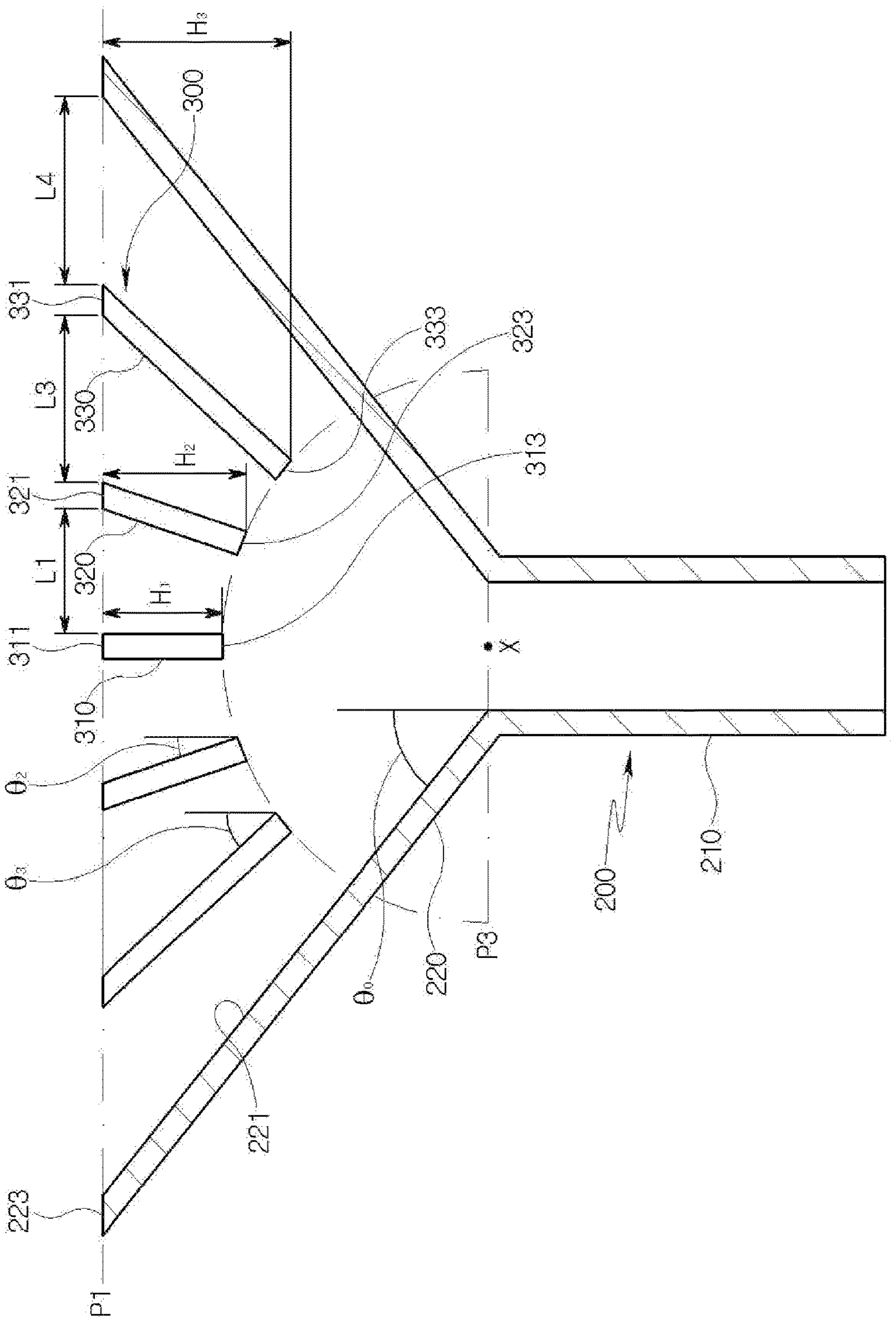

【FIG. 9】
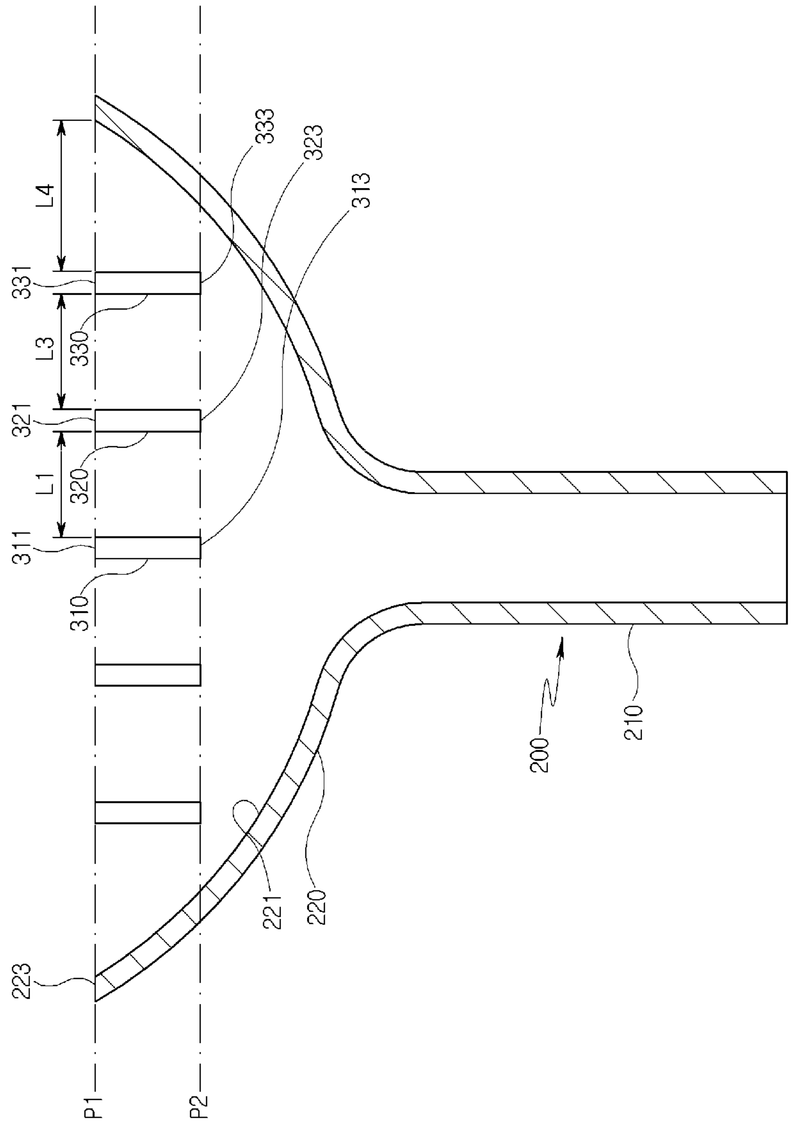

【FIG. 10】
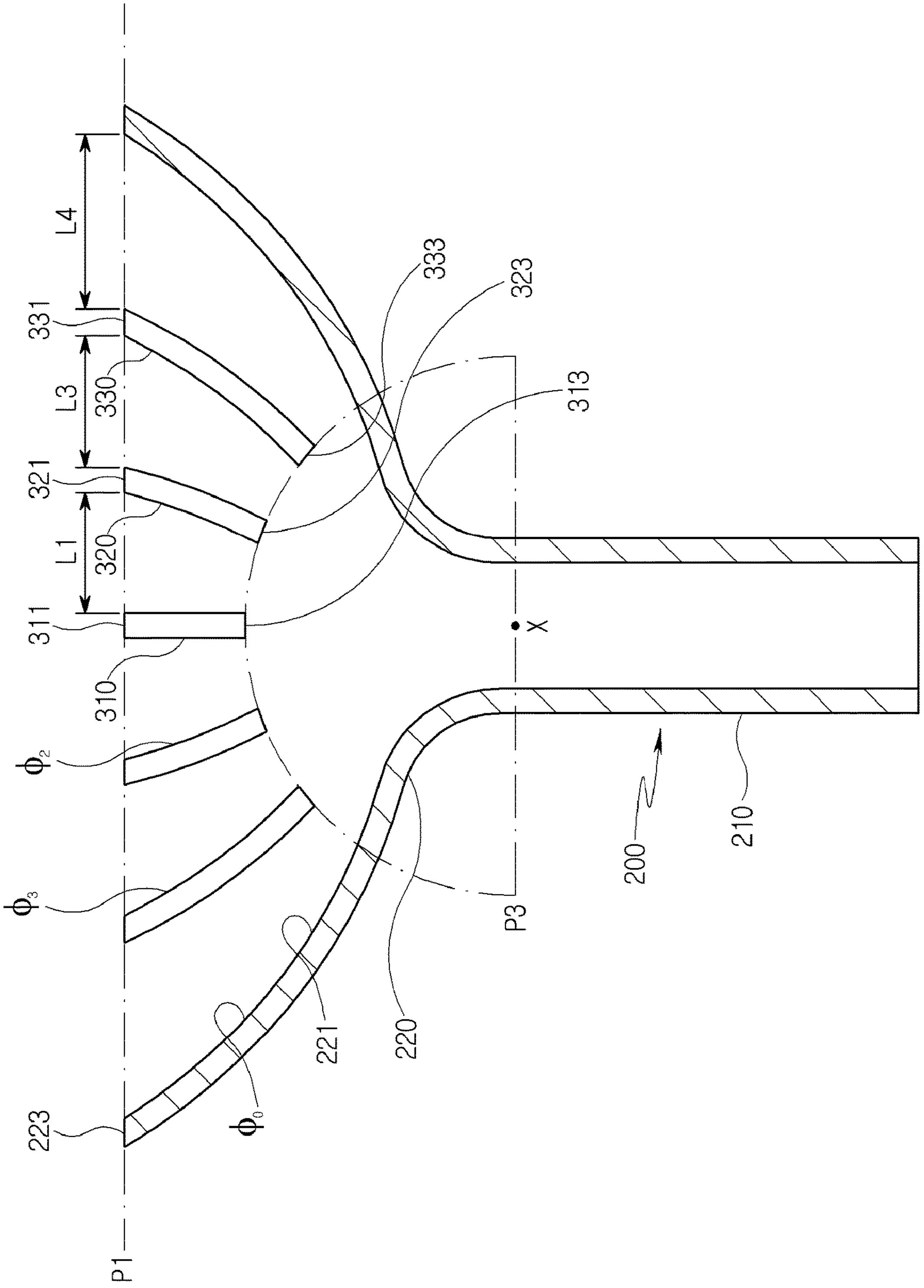

【FIG 11】
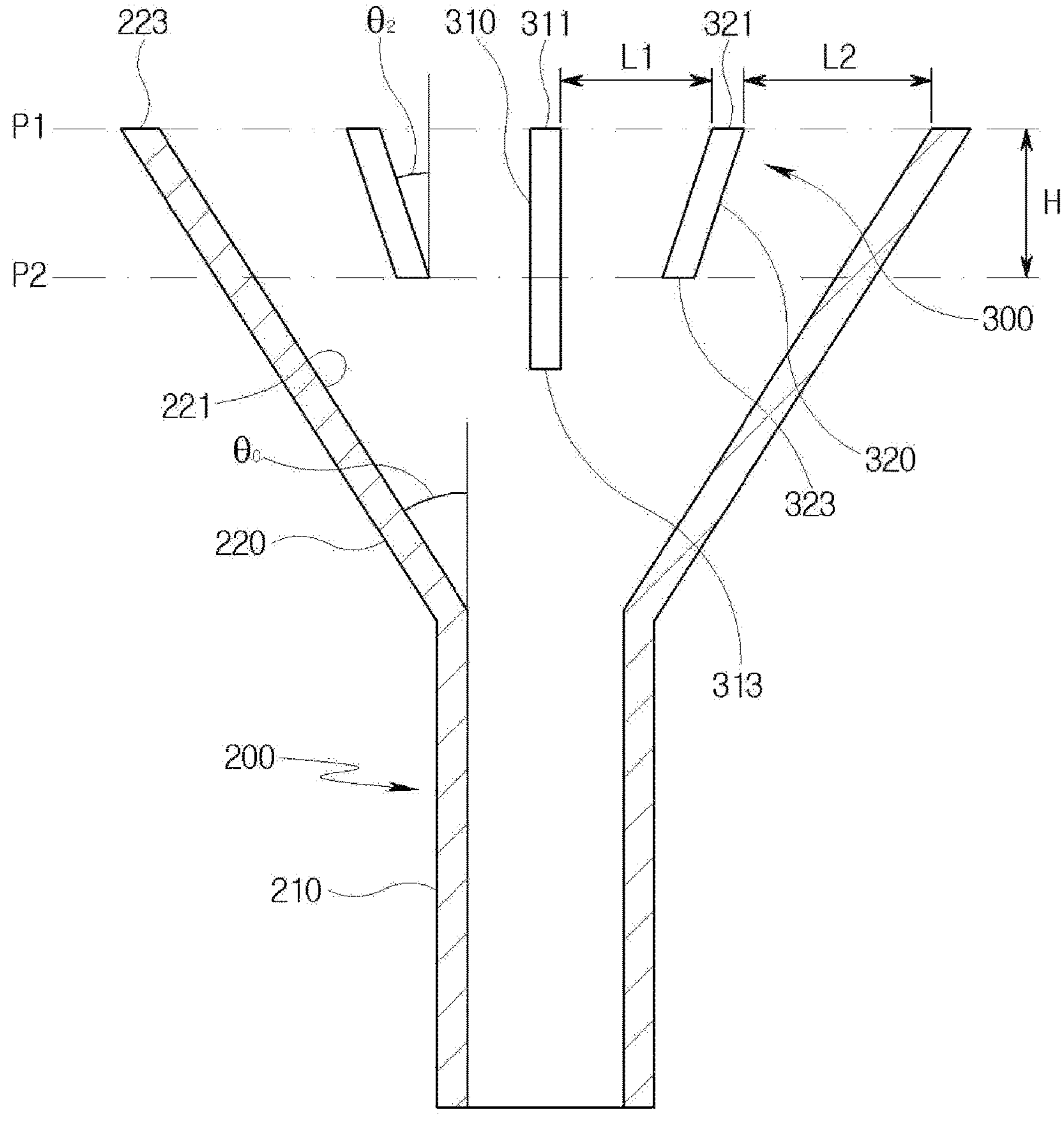

BLADE WITH IMPROVED COOLING PERFORMANCE AND GAS TURBINE HAVING THE SAME

CROSS REFERENCE TO RELATED APPLICATION

The present application claims priority to Korea Patent Application No. 10-2023-0038157, filed Mar. 23, 2023, the entire contents of which is incorporated herein for all purposes by this reference.

FIELD

The present disclosure relates to a blade with improved cooling performance and a gas turbine having the same, more particularly, a blade with improved cooling performance by injecting a cooling fluid uniformly so as to form a cooling film in a wide region on a surface of a blade.

BACKGROUND

Generally, a turbine is a power generating apparatus which converts the thermal energy of a fluid such as gas or steam into a rotating force that is mechanical energy. The turbine includes a rotor provided with a plurality of buckets (i.e., blades) arranged to axially rotate the rotor by the force of the fluid flowing through the bucket arrangement, and a casing provided with a plurality of fixed diaphragms (i.e., vanes) surrounding the rotor.

A gas turbine includes a compressor section, a combustor section, and a turbine section. When the compressor rotates, it draws external air into itself and compresses the air within the compressor. The compressed air is conveyed to the combustor, where the compressed air is mixed with fuel for combustion. High-temperature, high-pressure gas generated from the combustor passes through the turbine section and rotates the rotor of the turbine, thus driving a generator.

The compressor section and the turbine section of the gas turbine are connected through a single rotor, and a plurality of stages of rotor disks are mounted on an outer periphery of the rotor. A plurality of blades are mounted along a circumferential outer periphery of the rotor disk.

In general, the blades are operated under high-temperature environment, therefore, the surface of each blade must be continuously cooled to prevent the blade from being thermally damaged.

To this end, referring to FIG. 1, a plurality of gas holes 20 are formed in a blade 10, in which the plurality of gas holes 20 are coupled with an internal flow passage (not shown) through which cooling fluid flows. Cooling fluid is discharged from the gas holes 20 and flows along the surface of the blade 10 and forms a cooling film, thus cooling the blade 10.

Here, generally, the wider an exit area of the gas hole 20 is, the higher the coverage of the cooling film over the blade surface of the cooling fluid is, resulting in increased cooling efficiency.

For the shape of the gas hole 20, a fan-shaped hole is widely used. In a fan-shaped hole, if a diffuser expansion angle is large ($\theta>15°$), as shown in a region A in FIG. 2, separation may take place, potentially causing biased injection of the cooling fluid to one side. In such instances, a notable problem arises, in which the cooling performance over the blade surface significantly deteriorates.

SUMMARY

The present disclosure is derived to solve the problem of the corresponding technical field as above, and an object of the present disclosure is to provide a blade and a gas turbine which have improved cooling performance of the blade, by forming a cooling film on a wider region on a surface of the blade, ensuring of uniform injection of the cooling fluid.

One embodiment is a blade, including: a body part; an injection hole comprising a communication part connected to an internal flow passage formed inside the body part; and an extension connecting the communication part and a surface of the blade to each other and having a width gradually increasing from the communication part to a direction of the surface of the blade and configured to inject a cooling fluid to the surface of the blade; and an injection guide means disposed in the extension and configured to uniformly inject the cooling fluid in an expanding manner so as to form a cooling film on the surface of the blade.

The injection guide means may include a plurality of partition walls which are formed in the extension along a flow direction of the cooling fluid, and the plurality of partition walls may be arranged to form a line symmetry based on a central axis of the injection hole.

The injection guide means may include: a first partition wall disposed at a center side of the extension; and a pair of second partition walls disposed between the first partition wall and an inner wall of the extension and disposed at both sides of the first partition wall.

An interval value L1 between the first partition wall and one of the pair second partition walls may be larger than an interval value L2 between the one of the pair of second partition walls and the inner wall of the extension so that a cooling fluid is injected relatively more to an edge side of the extension than to a center side of the extension.

An angle value $\theta_2$ of each of the pair of second partition walls may be smaller than an angle value $\theta_0$ of the inner wall of the extension.

The first partition wall may include: a first outer end facing the surface of the blade; and a first inner end formed on an opposite side of the first outer end and facing the communication part, and each of the pair of second partition walls may include: a second outer end facing the surface of the blade; and a second inner end formed on an opposite side of the second outer end and facing the communication part.

The first outer end and the second outer end may be disposed to meet a first reference line P1 at a tip end of the extension; and the first inner end and the second inner end may be disposed at a same second reference line P2 at a predetermined depth between the surface of the blade and the communication part.

The first outer end and the second outer end may be disposed to meet an first reference line P1 at a tip end of the extension, and a depth value H2 of each of the apri of second partition walls may be greater than a depth value H1 of the first partition wall.

The first inner end and the second inner end may be disposed to meet an third reference line P3 of an arc shape formed based on a center point X at a tip end of the communication part.

The first outer end and the second outer end may be disposed to meet an first reference line P1 at a tip end of the extension; and the first inner end may protrude more toward the communication part than does the second inner end.

The injection guide means may include: a first partition wall disposed at a center side of the extension; a pair of second partition walls disposed between the first partition wall and an inner wall of the extension and disposed at both sides of the first partition wall; and a pair of third partition walls disposed between the pair of second partition walls and the inner wall of the extension.

An interval value L3 between one of the pair of second partition walls and an adjacent one of the pair of third partition walls may be greater than an interval value L1 between the first partition wall and the one of the pair of second partition walls and is smaller than an interval value L4 between the adjacent one of the pair of third partition walls and the inner wall of the extension, so that a cooling fluid is injected relatively more to an edge side of the extension than to a center side of the extension.

An angle value $\theta_3$ of each of the pair of third partition walls is greater than an angle value $\theta_2$ of each of the pair of second partition walls and is smaller than an angle value $\theta_0$ of the inner wall of the extension.

The first partition wall may include: a first outer end facing the surface of the blade; and a first inner end formed on an opposite side of the first outer end and facing the communication part, and each of the pair of second partition walls may include: a second outer end facing the surface of the blade; and a second inner end formed on an opposite side of the second outer end and facing the communication part, and each of the pair of third partition walls may include: a third outer end facing the surface of the blade; and a third inner end formed on an opposite side of the third outer end and facing the communication part.

The first outer end, the second outer end, and the third outer end may be disposed to meet an first reference line P1 at a tip end of the extension; and a depth value H2 of the pair of second partition walls may be greater than a depth value H1 of the first partition wall, and is smaller than a depth value H3 of the pair of third partition walls.

The first inner end, the second inner end, and the third inner end may be disposed to meet an third reference line P3 of an arc shape formed based on a center point X at a tip end of the communication part.

The extension may have a shape of a concave curve gradually expanding more toward the surface of the blade from the communication part.

The first outer end, the second outer end, and the third outer end may be disposed to meet an first reference line P1 at a tip end of the extension; the first inner end, the second inner end, and the third inner end may be disposed at a same second reference line P2 at a predetermined depth between the surface of the blade and the communication part; and the first partition wall, the second partition wall and the third partition wall may have a shape of a straight line in a direction from the communication part toward the surface of the blade.

The first outer end, the second outer end, and the third outer end may be disposed to meet an first reference line P1 obtained at a tip end of the extension; and the first inner end, the second inner end, and the third inner end may be disposed to meet an third reference line P3 of an arc shape formed based on a center point X of the tip end of the communication part.

The first partition wall may have a shape of a straight line in a direction from the communication part toward the surface of the blade, the second partition wall and the third partition wall may have a shape of a curved line disposed in the direction from the communication part toward the surface of the blade, and a curvature value $\Phi_3$ of the third partition wall may be formed to be greater than a curvature value $\Phi_2$ of the second partition wall, and smaller than a curvature value $\Phi_0$ of the inner wall of the extension.

Another embodiment is a gas turbine, including: a casing; a compressor section disposed inside the casing and configured to compress introduced air; a combustor disposed inside the casing while being connected to the compression section, and configured to combust compressed air; a turbine section disposed inside the casing while being connected to the combustor, and configured to produce power by using combusted air; and a diffuser disposed inside the casing while being connected to the turbine section, and configured to discharge air to an outside, and the blade of claim 1 may be disposed at the compressor section or the turbine section.

According to the present disclosure, it is possible to prevent a problem of the cooling fluid separation by making the cooling fluid be uniformly injected to the blade surface.

This ensures to form the cooling film over a wide region of the blade surface in a stable manner, thereby improving the cooling performance with respect to the blade surface.

BRIEF DESCRIPTION OF THE DRAWINGS

FIG. 1 is a view illustrating a conventional gas hole disposed on a surface of a blade, FIG. 2 is a view illustrating a phenomenon in which a cooling fluid is separated inside a conventional gas hole, FIG. 3 is a view skeptically illustrating a structure of a gas turbine to which the present disclosure is applied, FIG. 4 is a view illustrating a structure of an arrangement of a blade and a gas hole according to an embodiment of the present disclosure, FIG. 5 is a view illustrating a first embodiment of a gas hole in a blade according to the present disclosure, FIG. 6 is a view illustrating a structure of a gas hole according to an embodiment of the present disclosure, FIG. 7 is a view illustrating a second embodiment of a gas hole in a blade according to the present disclosure, FIG. 8 is a view illustrating a third embodiment of a gas hole in a blade according to the present disclosure, FIG. 9 is a view illustrating a fourth embodiment of a gas hole in a blade according to the present disclosure, FIG. 10 is a view illustrating a fifth embodiment of a gas hole in a blade according to the present disclosure, and FIG. 11 is a view illustrating a sixth embodiment of a gas hole in a blade according to the present disclosure.

DETAILED DESCRIPTION

Advantages and characteristics of the present disclosure and a method of achieving the advantages and characteristics will be clear by referring to exemplary embodiments described below in detail together with the accompanying drawings. However, the present disclosure is not limited to exemplary embodiments disclosed herein but may be implemented in various forms. The exemplary embodiments are provided by way of examples only so that a person of ordinary skilled in the art can fully understand the nature and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the context clearly indicate otherwise, such as when the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

A size and a thickness of each component illustrated in the drawing are illustrated for convenience of description, and the present disclosure is not limited to the size and the thickness of the component illustrated.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Also, it is noted that any one feature of an embodiment of the present disclosure described in the specification may be applied to another embodiment of the present disclosure. Similarly, the present invention encompasses any embodiment that combines features of one embodiment and features of another embodiment.

Hereinafter, embodiments according to the present disclosure will be described in detail with reference to the accompanying drawings. Unless in contradiction, a plurality of embodiments to be explained below may be applied redundantly.

Before describing the present disclosure, a configuration of a gas turbine 1 will be described with reference to accompanying drawings.

Referring to FIG. 3, a gas turbine 1 may basically include a casing 2 which forms an appearance of the gas turbine 1, a compressor section 4 configured to compress air, a combustor section 5 configured to combust the compressed air, a turbine section 6 configured to generate electricity using combustion gas, a diffuser 7 configured to discharge exhaust gas, and a rotor 3 which connects the compressor section 4 and the turbine section 6 to each other to transmit rotating force.

External air is drawn into the compressor section 4 that thermodynamically corresponds to an upstream side of the gas turbine 1. The drawn external air is compressed by adiabatic compression. The compressed air is drawn into the combustor section 5 and mixed with fuel, and the mixture is combusted through a constant pressure combustion process. Combustion gas is drawn into the turbine section 6 corresponding to a downstream side of the gas turbine 1 and is expanded through an adiabatic expansion process.

Based on a flow direction of the air, it is described that the compression section 4 is disposed at a front side of the casing 2, and the turbine section 6 is provided at a rear side thereof.

A torque tube 3*b* for transmitting rotational torque generated from the turbine section 6 to the compressor section 4 is provided between the compressor section 4 and the turbine section 6.

The compressor section 4 is provided with a plurality (e.g., fourteen) of compressor rotor disks 4*a*. The compressor rotor disks 4*a* are coupled by a tie rod 3*a* such that they are not spaced apart from each other in an axial direction.

The compressor rotor disks 4*a* are arranged along the axial direction of the tie rod 3*a*. A flange (not shown) protruding in the axial direction is formed around an outer circumferential portion of each compressor rotor disk 4*a* and is coupled to a neighboring rotor disk 4*a* so as to prevent the adjacent rotor disks 4*a* from rotating relative to each other.

A plurality of blades (or "buckets") 100 are radially coupled to an outer circumferential surface of each compressor rotor disk 4*a*. Each of the blades 100 includes a dovetail (not shown) by which the blade 100 is coupled to the compressor rotor disk 4*a*.

The fastening method of the dovetail is of a tangential type or an axial type. This type may be selected according to the required structure of the commercial gas turbine. In some cases, the compressor blade 100 may be fastened to the compressor rotor disk 4*a* using a fastener other than the dovetail.

Here, relative to a rotation of the compressor blades 100, a plurality of vanes (not shown)(or nozzles) may be mounted to a diaphragm (not shown) and disposed on an inner circumferential surface of the compressor section 4 in the casing 2.

The tie rod 3*a* passes through respective central portions of the compressor rotor disks 4*a* and has a first end coupled to the farthest upstream compressor rotor disk 4*a* and a second end fixed to the torque tube 3*b*.

The tie rod 3*a* may be variously configured depending on the structure of the gas turbine, and is not necessarily limited to a shape illustrated in the drawings.

For example, one tie rod may be formed to pass through the centers of compressor rotor disks, a plurality of tie rods may be arranged circumferentially, or a combination thereof may be used.

Although not illustrated in the drawings, a vane, which serves as a guide vane in the following position of the diffuser and is called a deswirler, may be installed in the compressor of the gas turbine to adjust the flow angle of a fluid, entering the inlet of the combustor after the pressure of the fluid increases, to a design flow angle.

The combustor 5 mixes the compressed air introduced thereinto with fuel for combustion to produce high-temperature and high-pressure combustion gas with high energy, and increases the temperature of the combustion gas to a temperature at which the combustor 5 and turbine components 6 are able to be resistant to heat in a constant-pressure combustion process.

The constituent combustor of the combustion system of the gas turbine may consist of a plurality of combustors arranged in a shell form in the casing.

Meanwhile, the combustion gas exiting the combustor 5 expands in the turbine section 6 to apply driving force and reaction force to an impeller of the turbine section 6, thus generating mechanical energy.

Some of the mechanical energy obtained from the turbine section 6 is supplied as energy needed to compress air in the compressor section 4, and the remaining mechanical energy is used to drive a generator and produce electric power.

The turbine section 6 is formed of a plurality of stators and a plurality of rotors which are alternately arranged in a turbine casing. The rotors are driven by the combustion gas so as to rotate an output shaft coupled to the generator.

The turbine section 6 includes a plurality of turbine rotor disks 6*a*, each configured basically the same as the compressor rotor disks 4*a*.

The turbine rotor disk 6*a* also includes a flange (not shown) provided for coupling with a neighboring turbine rotor disk 6*a*, and a plurality of turbine blades (or "buckets") 100 which are radially provided and coupled to the turbine rotor disk 6*a* in a dovetail coupling manner.

Relative to a rotation of the turbine blades 100, a plurality of vanes (not shown)(or may be referred to as "nozzles") may be mounted to a diaphragm (not shown) and disposed on an inner circumferential surface of the casing 2 in the turbine section 6.

In the gas turbine having the above configuration, introduced air is compressed in the compressor section 4, combusted in the combustor section 5, transferred to the turbine section 6 to generate electricity, and then discharged to the atmosphere through the diffuser 7.

Here, rotational components of the gas turbine include the torque tube 3*b*, the compressor rotor disks 4*a*, the compressor blades 100, the turbine rotor disks 6*a*, the turbine blades 100, and the tie rod 3*a*, which together with similarly provided components may be collectively referred to as the rotor of the gas turbine, or a rotational body. Meanwhile, non-rotational components include the casing 2, the vanes (not shown), the diaphragm (not shown), which together with similarly provided components may be collectively referred to as the stator of the gas turbine, or a stationary body.

A general structure of the gas turbine is as described above, and the present disclosure applied to this gas turbine will be described below.

Referring to FIGS. 4 to 6, the blade 100 according to an embodiment of the present disclosure may include a body part 110, an injection hole 200, and an injection guide means 300.

The body part 110 may form an external appearance of the blade 100. An internal flow passage (not shown) is formed inside body part 110. A cooling fluid flows through the internal flow passage. The direction in which the body part 110 extends may be referred to as a height direction H.

The injection hole 200 may be provided in plurality on the surface of the body part 110, and the cooling fluid injected from the injection hole 200 may flow along the surface of the body part 110 to form a cooling film. Due to the cooling film formed on a surface of the body part 110, the blade 100 may be protected from a thermal damage.

The injection hole 200 may include a communication part 210 and an extension 220.

The communication part 210 may be connected to the internal flow passage of the blade 100. The communication part 210 may be elongated in a longitudinal direction L. In the longitudinal direction L, the direction from the communication part 210 toward the extension 220 may be referred to as a cooling fluid discharge direction or a cooling fluid downstream direction, and its opposite direction may be referred to as a cooling fluid upstream direction.

The extension 220 may connect the communication part 210 and the surface of the blade 100 to each other. A size of the extension 220 may expand gradually from a surface of the communication part 210 toward the surface of the blade 100. Specifically, the width of the extension 220 in the height direction H may gradually increase from the surface of the communication part 210 to the surface of the blade 100. The cooling fluid introduced from the internal flow passage to the communication part 210 may flow through the extension 220 and be injected to the surface of the blade 100 while expanding widely via the extension 220. In general, the extension 220 functions as an outlet of the cooling fluid. The cooling fluid injected while expanding may form the cooling film wider on the surface of the blade 100.

Here, an expansion angle $\theta_0$ of the extension 220 may be 20° or higher, however, is not necessarily limited thereto.

The injection guide means 300 may be disposed in the extension 220, and may serve to facilitate the uniform and expanding injection of the cooling fluid to ensure the stable formation of the cooling film on the surface of the blade 100.

According to an embodiment, the injection guide means 300 may have multiple partition walls which splits the discharging flow of the cooling fluid from the communication part 210 toward the surface of the blade 100. The multiple partition walls may be formed in the extension 220 by extending along the direction of the discharging flow of the cooling fluid. When a central axis is defined in the injection hole along the longitudinal direction L, the multiple partition walls may be arranged such that they form a line symmetry based on the central axis. When the number of the partition walls are in an even number, one half of the partition walls are positioned one side of the central axis and the other half of the partition walls are positioned the other side of the central axis. When the number of the partition walls are in an odd number, one of the partition wall is position at the center of the extension (i.e., on the central axis) while one half of the remaining partition walls are positioned one side of the central axis and the other half of the remaining partition walls are position the other side of the central axis. The interval between adjacent partition walls positioned at the center of the extension may be smaller than intervals between other adjacent partition walls. The interval between adjacent partition walls may gradually increase from the center of the extension toward an inner wall of the extension.

In a first embodiment of the present disclosure, the injection guide means 300 may include a first partition wall 310, and a second partition wall 320.

The first partition wall 310 may be disposed at a center side of the extension 220. Further, the first partition wall 310 may include a first outer end 311 facing the surface of the blade 100, and a first inner end 313 formed on an opposite side of the first outer end 311 and facing the communication part 210.

The second partition wall 320 may be formed between the first partition wall 310 and an inner wall 221 of the extension 220 in the height direction H. The second partition wall 320 may be disposed, as a pair, at both sides of the first partition wall 310. In other words, one of the pair of the second partition walls 320 is disposed between the first partition wall 310 and one side of the inner wall 221 of the extension 220 and the other of the pair of the second partition walls 320 is disposed between the first partition wall 310 and the other side of the inner wall 221 of the extension 220.

Further, the second partition wall 320 may include a second outer end 321 facing the surface of the blade 100, and a second inner end 323 formed on an opposite side of the second outer end 321 and facing the communication part 210. That is, three partition walls may be provided in the first embodiment.

Here, the first outer end 311 and the second outer end 321 may be disposed to meet an first reference line P1 in the height direction H at a tip end 223 of the extension 220. The first reference line P1 may be a straight line in the height direction H at the tip end 223 of the extension. That is, the first outer end 311 and the second outer end 321 may extend in the longitudinal direction L to the same line, the first reference line P1.

The first inner end 313 and the second inner end 323 may be disposed to meet a second reference line P2 which is positioned between the surface of the blade 100 and the communication part 210. The first reference line P1 and the second reference line P2 may be parallel to each other.

In the first embodiment of the present disclosure, the first partition wall 310 and the second partition wall 320 may be disposed with the same depth $H_1$ inside the extension 220 in the longitudinal direction L.

Here, an interval value L1 between the first partition wall 310 and the second partition wall 320, measured at the first reference line P1, may be formed to be smaller than an interval value L2 between the second partition wall 320 and the inner wall of the extension 220, measured at the first reference line P1, so that more cooling fluid can be injected along an edge side of the extension 220 than along a center side of the extension 220. This offers an advantage of enabling a wider and broader injection of the cooling fluid, thereby increasing a region in which the cooling film is formed.

In addition, the first partition wall 310 may be disposed to be parallel to a flow direction of the cooling fluid. In other words, the first partition wall 310 may be formed along the longitudinal direction A, in which the communication part 210 is elongated. When an angle value $\theta_0$ is defined as an angle between the longitudinal direction L and the inner wall 221 of the extension 220 and an angle value $\theta_2$ is defined as an angle between the longitudinal direction L and the second partition wall 320, the angle value $\theta_2$ may be formed to be smaller than the angle value $\theta_0$.

According an embodiment, an interval between the first partition wall 310 and a second partition wall 320 in the height direction H gradually increases from the communication part 210 toward the surface of the blade 100. In addition, an interval between the second partition wall 320 and the inner wall 221 of the extension 220 gradually increase from the communication part 210 toward the surface of the blade 100. With this configuration, it is possible to prevent a problem of the cooling fluid separation during passage through the extension 220. At the same time, it allows for an expansion of the cooling fluid injection area, thereby ensuring stable formation of the cooling film.

That is, through the described configuration, it is possible to make the cooling film be formed stably on the surface of the blade 100, by allowing the cooling fluid to be dispersed and injected evenly without a separation, thereby improving a cooling performance of the blade 100.

Referring to FIG. 7, the blade 100 according to a second embodiment of the present disclosure may include the body part 110, the injection hole 200, and the injection guide means 300.

Since the body part 110 and the injection hole 200 are the same as those of the first embodiment, detailed description related thereto will be omitted and the injection guide means 300 will be described hereinafter.

The injection guide means 300 may be disposed in the extension 220, and may serve to facilitate the uniform and expanding injection of the cooling fluid to ensure the stable formation of the cooling film on the surface of the blade 100.

In the second embodiment of the present disclosure, the injection guide means 300 may include the first partition wall 310 and the second partition wall 320.

The first partition wall 310 may be disposed at the center side of the extension 220. Further, the first partition wall 310 may include the first outer end 311 facing the surface of the blade 100, and the first inner end 313 formed on an opposite side of the first outer end 311 and facing the communication part 210.

The second partition wall 320 may be formed between the first partition wall 310 and the inner wall 221 of the extension 220 in the height direction H. The second partition wall 320 may be disposed, as a pair, at both sides of the first partition wall 310. In other words, one of the pair of the second partition wall 320 is disposed between the first partition wall 310 and one side of the inner wall 221 of the extension 220 and the other one of the pair of the second partition wall 320 is disposed between the first partition wall and the other side of the inner wall 221 of the extension 220.

Further, the second partition wall 320 may include the second outer end 321 facing the surface of the blade 100, and the second inner end 323 formed on an opposite side of the second outer end 321 and facing the communication part 210. That is, three partition walls may be provided in the second embodiment.

Here, the first outer end 311 and the second outer end 321 may be disposed to meet the first reference line P1, obtained by extending the tip end 223 of the extension 220 in the height direction H. That is, the first outer end 311 and the second outer end 321 may extend in the longitudinal direction L to the same line.

In addition, the first inner end 313 and the second inner end 323 may be disposed to meet an third reference line P3 which has an arc shape formed based on a predetermined center point X. The center point X may be positioned at the tip end of the communication part 210.

According to an embodiment, the distance between the first inner end 313 and the center point X and the distance between the second inner ends 323 and the center point X may be the same.

The cooling fluid that has passed through the communication part 210 is distributed to flow in a radial direction relative to the center point X in the communication part 220. In this embodiment, the cooling fluid may disperse radially relative to the center point X along the paths formed between the first partition wall 210, the second partition walls 320 and the inner wall 221 of the extension 220. The positions of the first inner end 313 and the second inner end 323 are designed based on the above configuration. According to an embodiment, virtually extended lines from the first partition wall 210 and the second partition walls 310 may meet at the center point X.

Through this configuration, the cooling fluid may disperse radially toward the arc shape of the third reference line P3 and may be relatively uniformly separated at placement positions of the first inner end 313 and the second inner end 323, which respectively meet the third reference line P3 of the arc shape. Then, the cooling fluid may pass through between the first partition wall 310, the second partition walls 320, and the inner wall 221 of the extension 220.

In such a case, a depth value H2 of the second partition wall 320 may be formed to be greater than a depth value H1 of the first partition wall 310, when they are measured from the first reference line P1.

Meanwhile, the interval value L1 between the first partition wall 310 and the second partition wall 320, measured at the first reference line P1, may be formed to be smaller than the interval value L2 between the second partition wall 320 and the inner wall 221 of the extension 220, measured at the first reference line P1, so that more cooling fluid can be injected along the edge side of the extension 220 than along the center side of the extension 220. This offers an advantage of enabling wider and broader injection of the cooling fluid, thereby increasing a region in which the cooling film is formed.

In addition, the first partition wall 310 may be disposed to be parallel to the flow direction of the cooling fluid. When an angle value $\theta_0$ is defined as an angle between the longitudinal direction L and the inner wall 221 of the extension 220 and an angle value $\theta_2$ is defined as an angle between the longitudinal direction L and the second partition wall 320, the angle value $\theta_2$ may be formed to be smaller than the angle value $\theta_0$.

According to this configuration, the interval between the first partition wall 310 and the second partition wall 320 in the height direction H may gradually increases from the communication part 210 toward the surface of the blade 100. In addition, the interval between the second partition wall 320 and the inner wall 221 of the extension 220 gradually increases from the communication part 210 toward the surface of the blade 100. This configuration may prevent a problem of cooling fluid separation during passage through the extension 220. At the same time, it allows for an expansion of the cooling fluid injection area, thereby ensuring stable formation of the cooling film.

That is, through described configuration, by allowing the cooling fluid to be evenly dispersed and injected without occurrence of the separation, the cooling film may be stably formed on the surface of the blade 100, thereby improving the cooling performance of the blade 100.

Referring to FIG. 8, the blade 100 according to the third embodiment of the present disclosure may include the body part 110, the injection hole 200, and the injection guide means 300.

Since the body part 110 and the injection hole 200 are the same as those of the second embodiment, detailed description related thereto will be omitted and the injection guide means 300 will be described hereinafter.

The injection guide means 300 may be disposed in the extension 220, and may serve to facilitate the uniform and expanding injection of the cooling fluid to ensure the stable formation of the cooling film on the surface of the blade 100.

In the third embodiment of the present disclosure, the injection guide means 300 may include the first partition wall 310, the second partition wall 320, and a third partition wall 330.

The first partition wall 310 may be disposed at the center side of the extension 220. Further, the first partition wall 310 may include the first outer end 311 facing the surface of the blade 100, and the first inner end 313 formed on an opposite side of the first outer end 311 and facing the communication part 210.

The second partition wall 320 may be formed between the first partition wall 310 and the third partition wall 330 in the height direction H. The second partition wall 320 may be disposed, as a pair, at both sides of the first partition wall 310.

Further, the second partition wall 320 may include the second outer end 321 facing the surface of the blade 100, and the second inner end 323 formed on an opposite side of the second outer end 321 and facing the communication part 210.

The third partition wall 330 may be formed between the second partition wall 320 and the inner wall 221 of the extension 220 in the height direction H. The third partition wall 330 may include a third outer end 331 facing the surface of the blade 100, and a third inner end 333 formed on an opposite side of the third outer end 331 and facing the communication part 210. That is, five partition walls may be disposed in the third embodiment.

Here, the first outer end 311, the second outer end 321, and the third outer end may be disposed to meet the first reference line P1, obtained by extending the tip end 223 of the extension 220 in the height direction H. That is, the first outer end 311, the second outer end 321, and the third outer end 331 may extend in the longitudinal direction L to the same line.

In addition, the first inner end 313, the second inner end 323, and the third inner end 333 may be disposed to meet the third reference line P3 which has an arc shape formed based on a predetermined center point X. The center point X may be position at the tip end of the communication part 210.

The cooling fluid that has passed through the communication part 210 is distributed to flow in a radial direction relative to the center point X in the communication part 220. In this embodiment, the cooling fluid may disperse radially relative to the center point X along the paths formed between the first partition wall 210, the second partition walls 320, the third partition walls 330, and the inner wall 221 of the extension 220. The positions of the first inner end 313, the second inner end 323, and the third inner end 333 are designed based on the above configuration. According to an embodiment, virtually extended lines from the first partition wall 311, the second partition walls 320, and the third partition walls 330 may meet at the center point X.

Through this configuration, the cooling fluid may disperse radially toward the arc shape of the third reference point P3 and may be relatively uniformly separated at placement positions of the first inner end 313, the second inner end 323, and the third inner end 333, which respectively meet the third reference line P3 of the arc shape. Then, the cooling fluid may pass through between the first partition wall 310, the second partition walls 320, the third partition walls 330, and the inner wall 221 of the extension 220.

In this case, the depth value H2 of the second partition wall 320 may be formed to be greater than the depth value H1 of the first partition wall, and to be less than the depth value H3 of the third partition wall 330, when they are measured from the first reference line P1. That is, the partition walls are arranged with increasing depth from the first partition wall 310 to the third partition wall 330.

Meanwhile, the interval value L1 between the first partition wall 310 and the second partition wall 320 may be formed to be smaller than the interval value L3 between the second partition wall 320 and the third partition wall 330 so that more cooling fluid can be injected along the edge side of the extension 220 than along the center side of the extension 220, when the interval values are measured at the first reference line P1. In addition, the interval value L3 between the second partition wall 310 and the third partition wall 330 may be formed to be smaller than an interval value L4 between the third partition wall 330 and the inner wall 221 of the extension 220.

This offers an advantage of enabling wider and broader injection of the cooling fluid, thereby increasing a region in which the cooling film is formed.

In addition, the first partition wall 310 may be disposed to be parallel to the flow direction of the cooling fluid. When an angle value $\theta_0$ is defined as an angle between the longitudinal direction L and the inner wall 221 of the extension 220, an angle value $\theta_2$ is defined as an angle between the longitudinal direction L and the second partition wall 320, and an angle value $\theta_3$ is defined as an angle between the longitudinal direction L and the third partition wall 330, the angle value $\theta_2$ may be formed to be smaller than the angle value $\theta_3$, and the angle value $\theta_3$ may be formed to be smaller than the angle value $\theta_0$.

According to this configuration, the interval L1 between the first partition wall 310 and the second partition wall 320, the interval L3 between the second partition wall 320 and the third partition wall 330, and the interval L4 between the third partition wall and the inner wall 221 of the extension 220, when the interval values are measured in the height direction H, may gradually increase from the communication part 210 toward the surface of the blade 100. This configuration may prevent the problem of cooling fluid separation during passage through the extension 220. At the same time, it allows for an expansion of the cooling fluid injection area, thereby ensuring stable formation of the cooling film.

That is, through described configuration, by allowing the cooling fluid to be evenly dispersed and injected without occurrence of the separation, the cooling film may be stably formed on the surface of the blade 100, thereby improving the cooling performance of the blade 100.

Referring to FIG. 9, the blade 100 according to a fourth embodiment of the present disclosure may include the body part 110, the injection hole 200, and the injection guide means 300.

The body part 110 may form an external appearance of the blade 100. An internal flow passage (not shown) is formed inside body part 110. A cooling fluid flows through the internal flow passage. The direction in which the body part 110 extends may be referred to as a height direction H.

The injection hole 200 may be provided in plurality on the surface of the body part 110, and the cooling fluid injected from the injection hole 200 may flow along the surface of the body part 110 to form the cooling film. Due to the cooling film formed on the surface of the body part 110, the blade 100 may be protected from thermal damage.

The injection hole 200 may include the communication part 210 and the extension 220.

The communication part 210 may be connected to the internal flow passage of the blade 100.

The extension 220 may connect the communication part 210 and the surface of the blade 100 to each other. A size of the extension 220 may expand gradually from the surface of the communication part 210 toward surface of the blade 100. Specifically, the width of the extension 220 in the height direction H may gradually increase from the surface of the communication part 210 to the surface of the blade 100. The cooling fluid introduced from the internal flow passage to the communication part 210 may flow through the extension 220 and be injected to the surface of the blade 100 while expanding widely via the extension 220. In general, the extension 220 function as an outlet of the cooling fluid. The cooling fluid injected while expanding may form the cooling film wider on the surface of the blade 100.

In the fourth embodiment of the present disclosure, the extension 220 may have a shape of a curve.

The injection guide means 300 may be disposed in the extension 220, and may serve to facilitate the uniform and expanding injection of the cooling fluid to ensure the stable formation of the cooling film on the surface of the blade 100.

In the fourth embodiment of the present disclosure, the injection guide means 300 may include the first partition wall 310, the second partition wall 320, and the third partition wall 330.

The first partition wall 310 may be disposed at the center side of the extension 220. Further, the first partition wall 310 may include the first outer end 311 facing the surface of the blade 100, and the first inner end 313 formed on an opposite side of the first outer end 311 and facing the communication part 210.

The second partition wall 320 may be formed between the first partition wall 310 and the inner wall 221 of the extension 220 in the height direction H. The second partition wall 320 may be disposed, as a pair, at both sides of the first partition wall 310. Further, the second partition wall 320 may include the second outer end 321 facing the surface of the blade 100, and the second inner end 323 formed on an opposite side of the second outer end 321 and facing the communication part 210.

The third partition wall 330 may be formed between the second partition wall and the inner wall 221 of the extension 220. The third partition wall 330 may include the third outer end 331 facing the surface of the blade 100, and the third inner end 333 formed on an opposite side of the third outer end 331 and facing the communication part 210.

Here, the first outer end 311, the second outer end 321, and the third outer end may be disposed to meet the first reference line P1, obtained by extending the tip end 223 of the extension 220 in the height direction H. That is, the first outer end 311, the second outer end 321, and the third outer end 331 may extend in the longitudinal direction L to the same line.

In addition, the first inner end 313, the second inner end 323, and the third inner end 333 may be disposed to meet the second reference line P2 formed between the surface of the blade 100 and the communication part 210. In this embodiment, the first partition wall 310, the second partition walls 320, and the third partition walls 330 may be formed to be parallel to each other.

Meanwhile, the interval value L1 between the first partition wall 310 and the second partition wall 320 may be formed to be smaller than the interval value L3 between the second partition wall 320 and the third partition wall 330 so that more cooling fluid can be injected along the edge side of the extension 220 than along the center side of the extension 220. In addition, the interval value L3 between the second partition wall 310 and the third partition wall 330 may be formed to be smaller than the interval value L4 between the third partition wall 330 and the inner wall 221 of the extension 220.

This offers an advantage of enabling a wider and broader injection of the cooling fluid, thereby increasing a region in which the cooling film is formed.

According to this configuration, the interval L1 between the first partition wall 310 and the second partition wall 320, the interval L3 between the second partition wall 320 and the third partition wall 330, and the interval L4 between the third partition wall and the inner wall 221 of the extension 220 may gradually increase from the communication part 210 toward the surface of the blade 100. This may prevent the problem of cooling fluid separation during passage through the extension 220. At the same time, it allows for an expansion of the cooling fluid injection area, thereby ensuring stable formation of the cooling film.

That is, in the fourth embodiment of the present disclosure, by allowing the cooling fluid to be evenly dispersed and injected without occurrence of the separation through the described configuration, the cooling film may be stably formed on the surface of the blade 100, thereby improving the cooling performance of the blade 100.

Referring to FIG. 10, the blade 100 according to a fifth embodiment of the present disclosure may include the body part 110, the injection hole 200, and the injection guide means 300.

Since the body part 110 and the injection hole 200 are the same as those of the fourth embodiment, detailed description related thereto will be omitted and the injection guide means 300 will be described hereinafter.

The injection guide means 300 may be disposed in the extension 220, and may serve to facilitate the uniform and expanding injection of the cooling fluid to ensure the stable formation of the cooling film on the surface of the blade 100.

In the fifth embodiment of the present disclosure, the injection guide means 300 may include the first partition wall 310, the second partition wall 320, and the third partition wall 330.

The first partition wall 310 may be disposed at the center side of the extension 220. Further, the first partition wall 310 may include the first outer end 311 facing the surface of the blade 100, and the first inner end 313 formed on an opposite side of the first outer end 311 and facing the communication part 210.

The second partition wall 320 may be formed between the first partition wall 310 and the inner wall 221 of the extension 220, and the second partition wall 320 may be disposed, as a pair, at both ends of the first partition wall 310. Further, the second partition wall 320 may include the second outer end 321 facing the surface of the blade 100, and the second inner end 323 formed on an opposite side of the second outer end 321 and facing the communication part 210.

The third partition wall 330 may be formed between the second partition wall 320 and the inner wall 221 of the extension 220, and the third partition wall 330 may include the third outer end 331 facing the surface of the blade 100, and the third inner end 333 formed on an opposite side of the third outer end 331 and facing the communication part 210.

Here, the first outer end 311, the second outer end 321, and the third outer end 331 may be disposed to meet the first reference line P1 obtained by extending the tip end of the extension 220. That is, the first outer end 311, the second outer end 321, and the third outer end 331 may extend to the same line.

In addition, the first inner end 313, the second inner end 323, and the third inner end 333 may be disposed to meet the third reference line P3 which has an arc shape formed based on a predetermined center point X. The center point X may be positioned at the tip end of the communication part 210.

The cooling fluid that has passed through the communication part 210 is distributed to flow in a radial direction relative to the center point X in the communication part 220. In this embodiment, the cooling fluid may disperse radially relative to the center point X along the paths formed between the first partition wall 310, the second partition walls 320 and the third partition walls 330 and the inner wall 221 of the extension 220. The positions of the first inner end 313, the second inner end 323, and the third inner end 333 are designed based on the above configuration.

Through this configuration, the cooling fluid may disperse radially toward the arc shape of the third reference line P3 and may be relatively uniformly separated at placement positions of the first inner end 313, the second inner end 323, and the third inner end 333, which respectively meet the third reference line P3 of the arc shape. Then, the cooling fluid may pass through between the first partition wall 310, the second partition wall 320, the third partition wall 330, and the inner wall 221 of the extension 220.

In the fifth embodiment, the second partition walls 320, and the third partition walls 330, and the inner wall 221 of the extension 220 may be in a shape having a concave curve when viewed from a direction perpendicular to the height direction and the length direction.

In this embodiment, a curvature value $\Phi_3$ of the third partition wall 330 may be formed to be greater than a curvature value $\Phi_2$ of the second partition wall 320, and smaller than a curvature value (o of the inner wall 221 of the extension 220.

According to an embodiment, the second partition wall 320 may have a constant curvature $\Phi_2$ from the second outer end 321 to the second inner end 323, third partition wall 330 may have a constant curvature $\Phi_3$ from the third outer end 331 to the third inner end 333, and the inner wall 221 of the extension 220 may have a constant curvature (o from the tip end 223 of the extension 220 to a position where the extension 220 meets the third reference line P3. Further, the constant curvature $\Phi_2$ may be smaller than the constant curvature $\Phi_3$ and the constant curvature $\Phi_3$ may be smaller than the constant curvature $\Phi_0$.

Because of this, it is possible to expect an effect in which the cooling fluid is injected more toward the edge side of the extension 220 from the center side of the extension 220.

Meanwhile, the interval value L1 between the first partition wall 310 and the second partition wall 320 may be formed to be less than the interval value L3 between the second partition wall 320 and the third partition wall 330 so that more cooling fluid can be injected along the edge side of the extension 220 than along the center side of the extension 220. In addition, the interval value L3 between the second partition wall 320 and the third partition wall 330 may be formed to be less than the interval value L4 between the third partition wall 330 and the inner wall 221 of the extension 220.

This has an advantage of allowing the cooling fluid to be injected more widely, thereby increasing a region in which the cooling film is formed.

According to this configuration, the interval L1 between the first partition wall and the second partition wall 320, the interval L3 between the second partition wall 320 and the third partition wall 330, and the interval L4 between the third partition wall 330 and the inner wall 221 of the extension 220 may gradually expand from the communication part 210 toward the surface of the blade 100. This may prevent the problem of occurrence of the separation during when the cooling fluid passes through the extension 220, and at the same time, may increase the region in which the cooling fluid is injected, thereby allowing the cooling film to be stably formed.

That is, in the fifth embodiment of the present disclosure, by allowing the cooling fluid to be evenly dispersed and injected without occurrence of the separation through the described configuration, the cooling film may be stably formed on the surface of the blade 100, thereby improving the cooling performance of the blade 100.

Meanwhile, in FIG. 11, a sixth embodiment of the blade according to the present disclosure is illustrated. Referring to FIG. 11, the first inner end 313 may protrude more along a direction of the communication part than does the second inner end 323. That is, the first inner end 313 may be disposed to protrude more inward than the second reference line P2 in the cooling fluid upstream direction.

In this case, the cooling fluid may be distributed to both ends with respect to the first inner end 313, and may be dispersed to the surface of the blade 100. The sixth embodiment may prevent the separation of the cooling fluid and obtain the effect of uniform dispersion, as the same as the first embodiment. The above effect may be applied in the same way to the third, fourth, and fifth embodiments referring to FIGS. 8 to 10.

The above-described description is only illustrative of the specific embodiments of the blade and the gas turbine.

Therefore, it may be easily understood by those skilled in the art that the substitution and modification of the present disclosure may be made in various forms without departing from the scope of the disclosure as defined in the following claims.

REFERENCE NUMERALS

| | |
|---|---|
| 100: blade | 110: body part |
| 200: injection hole | 210: communication part |
| 220: extension | 221: inner wall of the extension |
| 223: tip end of the extension | |
| 300: injection guide means | 310: first partition wall |
| 311: first outer end | 313: first inner end |
| 320: second partition wall | 321: second outer end |
| 323: second inner end | 330: third partition wall |
| 331: third outer end | 333: third inner end |

What is claimed is:

1. A blade, comprising:

a body part;

an injection hole comprising a communication part connected to an internal flow passage formed inside the body part; and an extension connecting the communication part and a surface of the blade to each other and having a width gradually increasing from the communication part to the surface of the blade and configured to inject a cooling fluid to the surface of the blade;

an injection guide means disposed in the extension and configured to uniformly inject the cooling fluid in an expanding manner so as to form a cooling film on the surface of the blade, and a center line passing through a central axis of the injection hole;

wherein the injection guide means comprises:

a first partition wall extending along the center line from an inside of the extension to the surface of the blade and comprising two sides, each facing an inner wall of the extension; and a second partition wall on each of the two sides of the first partition and forming a pair, each extending from the inside of the extension to the surface of the blade and disposed between the first partition wall and the inner wall of the extension, wherein a first distance is defined as a distance from the first partition wall to the second partition wall, and a second distance is defined as a distance from the second partition wall to the inner extension wall, both measured at the surface of the blade, wherein the first distance is smaller than the second distance.

2. The blade of claim 1, wherein the pair of second partition walls are arranged to form a line symmetry based on the center line.

3. The blade of claim 1, wherein an angle value $\theta_2$ of each of the pair of second partition walls is smaller than an angle value $\theta_0$ of the inner wall of the extension.

4. The blade of claim 1, wherein the first partition wall comprises:

a first outer end facing the surface of the blade; and a first inner end formed on an opposite side of the first outer end and facing the communication part, and wherein each of the pair of second partition walls comprises:

a second outer end facing the surface of the blade; and a second inner end formed on an opposite side of the second outer end and facing the communication part.

5. The blade of claim 4, wherein the first outer end and the second outer end are disposed to meet a first reference line P1 at a tip end of the extension; and wherein the first inner end and the second inner end are disposed at a same second reference line P2 at a predetermined depth between the surface of the blade and the communication part.

6. The blade of claim 4, wherein the first outer end and the second outer end are disposed to meet a first reference line P1 at a tip end of the extension, and wherein a depth value H2 of each of the pair of second partition walls is greater than a depth value H1 of the first partition wall.

7. The blade of claim 6, wherein the first inner end and the second inner end are disposed to meet a third reference line P3 of an arc shape formed based on a center point X at a tip end of the communication part.

8. The blade of claim 4, wherein the first outer end and the second outer end are disposed to meet a first reference line P1 at a tip end of the extension; and wherein the first inner end protrudes more toward the communication part than does the second inner end.

9. A gas turbine, comprising:

a casing;

a compressor section disposed inside the casing and configured to compress introduced air and produce compressed air;

a combustor disposed inside the casing and configured to combust the compressed air and produce combustion gas;

a turbine section disposed inside the casing and configured to produce power by using the combustion gas; and a diffuser disposed inside the casing and configured to discharge the combustion gas to an outside, wherein the blade of claim 1 is disposed at the compressor section or the turbine section.

10. The blade of claim 1, wherein the first partition wall is formed as a rectangle elongated along the center line, and the second partition wall is formed as a skewed rectangle elongated along the center line, leaning radially outward with respect to the center line as it extends toward the surface of the blade.

11. The blade of claim 1, wherein the injection guide means further comprises:

a line on each of the two sides, each parallel to the center line and extending from an inner wall of the communication part, wherein the second partition wall is disposed radially outward from the line with respect to the center line.

* * * * *